March 2, 1954  H. S. RITZEL  2,670,965
THREE-WHEELED VEHICLE IN WHICH THE DRIVER
AND A PASSENGER SIT ASTRADDLE
Filed June 11, 1948  5 Sheets-Sheet 1

INVENTOR.
HENRY S. RITZEL
BY
Irving H. Goodfriend
ATTORNEY

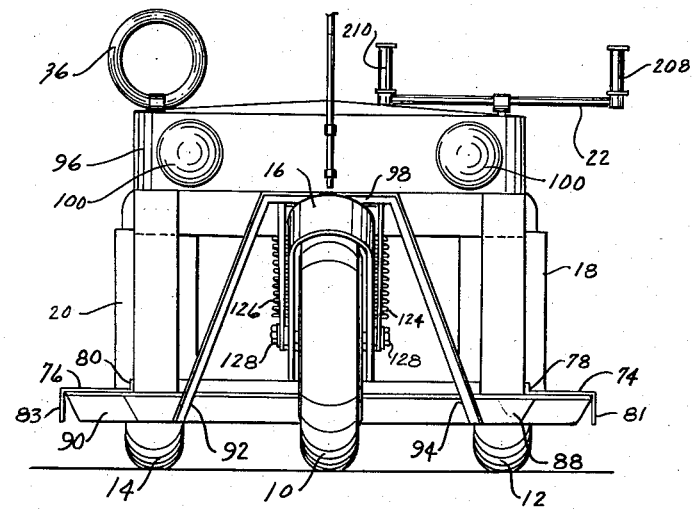
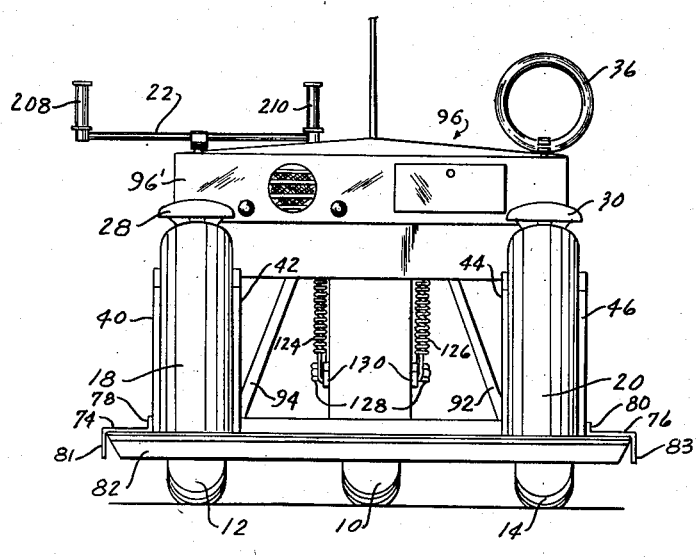

March 2, 1954 H. S. RITZEL 2,670,965
THREE-WHEELED VEHICLE IN WHICH THE DRIVER
AND A PASSENGER SIT ASTRADDLE
Filed June 11, 1948 5 Sheets-Sheet 3
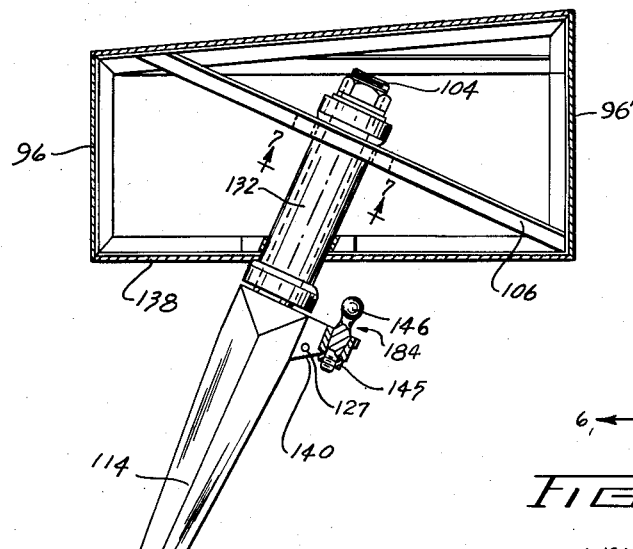
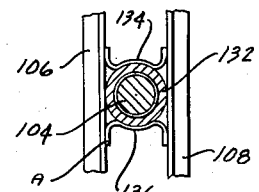
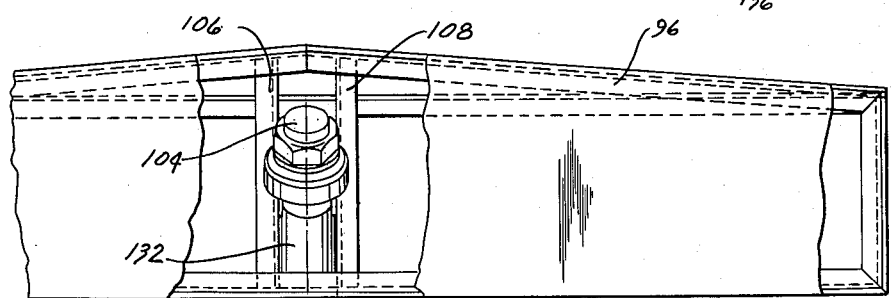
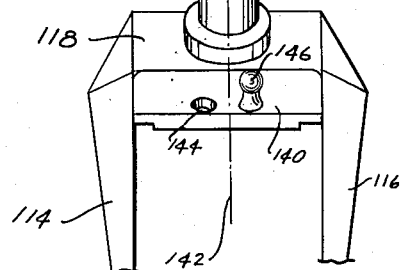
INVENTOR.
HENRY S. RITZEL
BY
Irving H. Goodfriend
ATTORNEY

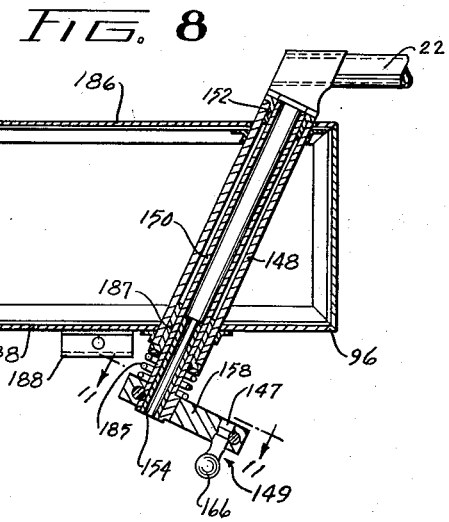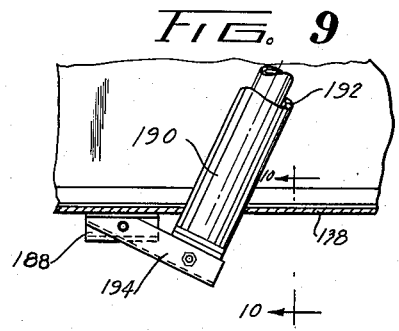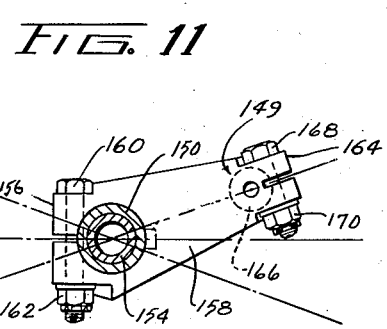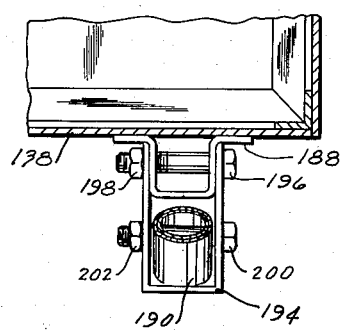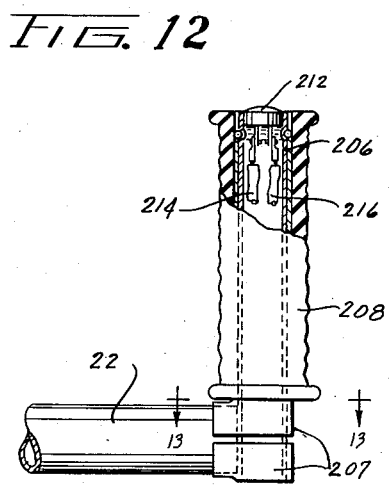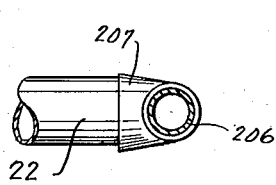
INVENTOR.
HENRY S. RITZEL March 2, 1954     H. S. RITZEL     2,670,965
THREE-WHEELED VEHICLE IN WHICH THE DRIVER
AND A PASSENGER SIT ASTRADDLE
Filed June 11, 1948
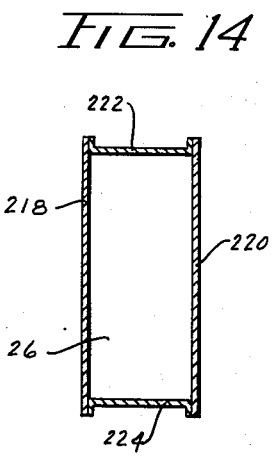
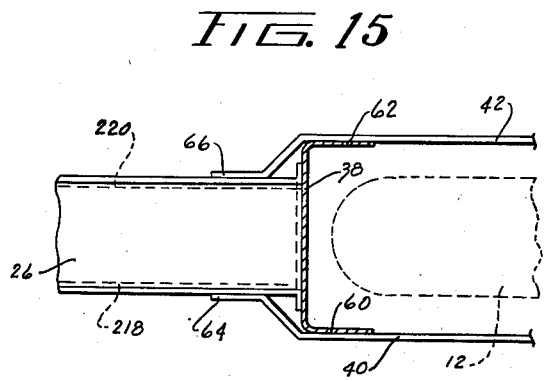
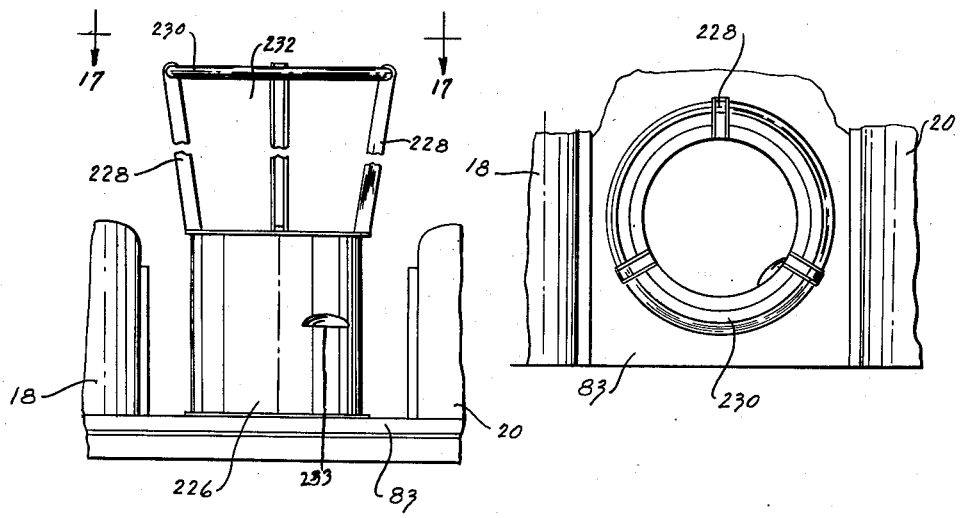
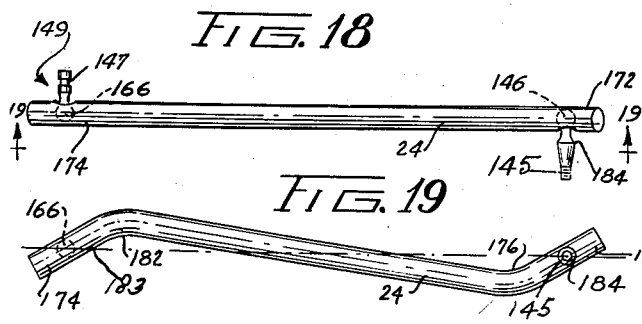
INVENTOR.
HENRY S. RITZEL
BY
Irving H. Goodfriend
ATTORNEY Patented Mar. 2, 1954

2,670,965

UNITED STATES PATENT OFFICE 2,670,965

THREE-WHEELED VEHICLE IN WHICH THE DRIVER AND A PASSENGER SIT ASTRADDLE

Henry S. Ritzel, New York, N. Y.

Application June 11, 1948, Serial No. 32,303

10 Claims. (Cl. 280—62)

The present invention relates to a vehicle in which the driver and a passenger or rider sit astraddle, as in a motorcycle, on each side of the vehicle and which vehicle is provided with a dash board in front of the driver and the passenger or rider.

The present invention contemplates improving the structure of the motorcycle, which in its present form has certain disadvantages in comparison to an automobile. When the conventional motorcycle is operated at low speed, it has no stability whatsoever, but reliance for balance must be placed upon the driver. Further conventional motorcycles are not constructed and designed so that they can be provided with a front transverse hollow beam provided with a dash board and in which may be carried instruments, such as a radio, which are necessary when a motorcycle is used by the armed forces or by the police. In addition, as distinguished from motorcycles, a dash board is provided having a top surface on which equipment may be carried in correct balance.

In the past, the stability sought for in the motorcycle, has been provided by the addition of a third wheel, as by adding a side car or making a tricycle of the vehicle.

However, these forms of attempted improvements in motorcycles did not include the urgently required dash board which, for the first time, is now provided for in the present invention by the vehicle construction herein illustrated.

In my co-pending application, Ser. No. 663,579, filed April 19, 1946, for Motorcycle And Side Frame, which has matured into Pat. No. 2,514,900, I have disclosed a construction for a motorcycle that is designed to permit the driver and the passenger to be seated astride thereof side by side and which construction is provided with lengthy foot boards for both the passenger and the driver.

The present invention is an improvement to the structure disclosed in my said co-pending application, which has been changed to permit the provision, among other things, of a dash and instrument board.

The present invention contemplates the provision of a vehicle of this character having a single steering wheel in the front and which is provided with a dash board that extends from side to side and encloses the head stock so that the lateral balance at the front wheel is not disturbed because the load or equipment on the dash board may be carried along the center line of the vehicle and across the dash.

The present invention further contemplates a vehicle having interchangeable parts and so arranged and constructed that it may be steered from either the right or left side of the vehicle. Such vehicle has special application when it is used for police duty as, for example, in leading a parade when one rider polices the right side of the street and the other rider the left side of the street. Further, the vehicle here contemplated is therefore readily adaptable for the export trade for use in different countries where the custom may be to drive the vehicle from one side or the other.

The present invention still further contemplates the provision of a stable and comfortably driven vehicle which therefore may be steered by one or the other hand of the driver and in which both hand grips of the handle bars are provided with sounding horn buttons.

The present invention yet further contemplates the provision of such a vehicle that is constructed and arranged so that falling rain will not be collected on the parts of the vehicle but is diverted away from the driver and the rider so that water cannot run down the sides against the legs of the driver and the passenger but flows off to the rear of the machine.

In order to permit ready observation at approximately the eye level of a mounted officer in all directions in comfort and safety from the rear of the vehicle, particularly where it is used for police or military purposes, the present invention contemplates the provision of an observation tower between and in line with the rear wheels.

These, other and further objects, advantages and uses of the present invention will be clear from the description which follows and the drawings appended thereto, in which:

Fig. 3 is a front view on the line 3—3 of Fig. 1.

Fig. 4 is a rear view on the line 4—4 of Fig. 2.

Fig. 5 is a section on the line 5—5 of Fig. 1.

Fig. 6 is a partial view on the line 6—6 of Fig. 5.

Fig. 7 is a section on the line 7—7 of Fig. 5.

Fig. 8 is a section on the line 8—8 of Fig. 1.

Fig. 9 is a partial view on the line 9—9 of Fig. 1.

Fig. 10 is a section on the line 10—10 of Fig. 9.

Fig. 11 is a view on the line 11—11 of Fig. 8.

Fig. 12 is a detail view, partially in section, of a hand grip used on the steering wheel of the vehicle of Fig. 1.

Fig. 13 is a section on the line 13—13 of Fig. 12.

Fig. 14 is a section on the line 14—14 of Fig. 2.

Fig. 15 is a section on the line 15—15 of Fig. 2.

Fig. 16 is a partial rear view of a modified vehicle according to my invention and having an observation tower between the rear wheels thereof, broken away to condense the drawing.

Fig. 17 is a view on the line 17—17 of Fig. 16.

Fig. 18 is a side elevation of the connecting rod for the steering mechanism.

Fig. 19 is a plan view thereof.

Figure 1:
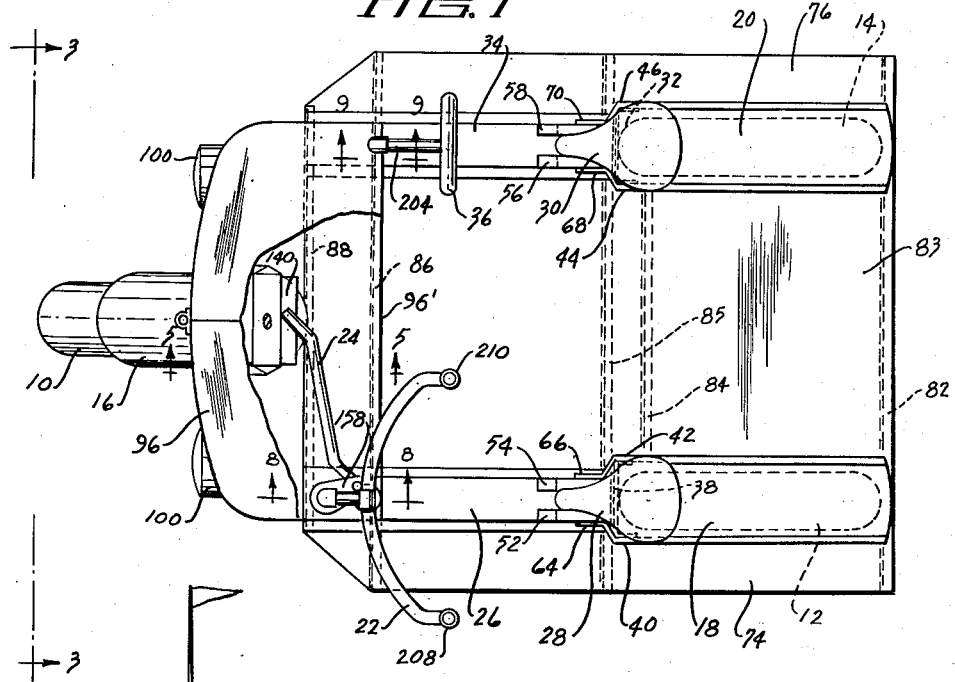
Fig. 1 is a top plan view of a vehicle embodying my invention.

Referring now to the drawings and more particularly to Figs. 1 to 4, my vehicle is provided with the single wheel 10, at the front thereof and which wheel constitutes the steering wheel, and the two rear wheels 12 and 14.

As is conventional, the front wheel is covered by the mud guard 16 and the rear wheels by the mud guards 18 and 20.

In the drawings, the front wheel 10 is steered from the left side of the vehicle, though as I shall describe, the handle bar 22 and the connecting rod 24 (which latter is illustrated in detail in Figs. 18 and 19) may be, if desired, interconnected with the corresponding parts so that the vehicle may be steered from the other or right side thereof.

Although I have illustrated a three wheeled vehicle with the steering wheel in the front and at the center thereof, it will be understood that my invention may be applied to other types of vehicles, such as those having two steering wheels, or a steering wheel in the rear of the vehicle, etc.

It will be further understood that the power plant and driving mechanism is similar to that conventionally installed in a motorcycle and therefore is not illustrated, since it forms no part of my invention. The power plant and drive for one of the rear wheels 12 may be slung under one of the longitudinal beams 26 of the vehicle frame which in the illustration is used to carry the driver's seat or saddle 28 and which seat is positioned in the back of the handle bar 22, the power plant being mounted on the vehicle frame in the same manner as is that of a conventional motorcycle.

The seat or saddle 30 for the passenger or rider is mounted on a saddle post 32 to which the other longitudinal beam 34 of the vehicle frame is secured. The seat or saddle 30 is positioned in back of the removable handle grip 36 by means of which the rider or passenger may steady himself when he rides on my vehicle.

It will be recognized that a vehicle having two wheels such as a bicycle or motorcycle, that is one having one track may be banked on a curve to compensate for lateral forces which are set up by this movement. On the other hand, a vehicle having two or three tracks, such as that with which the present invention is concerned cannot be so banked and therefore provision must be made to strengthen the frame in order to take up these lateral forces.

I accomplish this strengthening effect by means of the provision of the preferably U-shape in cross section (for detail of which see Fig. 15) saddle post 38, which is so mounted in the frame to connect the longitudinal box-like beam 26 with the split frame 40 and 42 around the rear wheel 12 and similarly by the saddle post 32 mounted in the frame to connect the longitudinal box-like beam 34 with the split frame 44 and 46 around the rear wheel 14.

It will be noted that the open ends of the saddle posts 32 and 38 are turned toward and bent around the respective rear wheels 12 and 14.

The seats 28 and 30 are mounted on respectively the cross members 48 and 50 and cross members, which are not shown in the drawing, which cross members are carried respectively by the members 52 and 54 and the members 56 and 58.

In order to suspend the seats 28 and 30 on the respective members which carry them, it will of course be understood that suitable springs, in the conventional manner, may be supplied.

The members 52 and 54 are connected to the side legs 60 and 62 of the saddle post 38 and to the sides of the longitudinal beam 26 and the members 56 and 58 to the corresponding side legs of the saddle post 32 and the outside of the longitudinal beam 34 to thereby give a rigid mounting for the seats 28 and 30.

The element of the saddle post 38 between the legs 60 and 62 has mounted thereon the rear end of the longitudinal box-like beam 26 and the members of the split frame 40 and 42 are respectively mounted on the legs 60 and 62 (see Fig. 15).

The split frame 40 and 42 is bent inwardly around the saddle post 38 toward the beam 26 to which it is secured by means of the flanges 64 and 66.

It will of course be understood that the longitudinal beam 34 is similarly secured to the saddle post 32 and the split frame 44 and 46, to the beam 34 by means of the flanges 68 and 70.

It will now be apparent that each saddle post 32 and 38 is comparatively wide in lateral cross section and provided with ample flange-like surfaces to stiffen it and serve as adequate surfaces on which the various members of the frame may be mounted. By reason of the width of the saddle posts and their preferably U-shape whereby the rear wheels of the vehicle are surrounded and encompassed by the rearwardly extending flange-like legs of the saddle post, the wheel opening and support is made compact and of greater strength and the saddle post in addition serves a portion of the function of the mud guard.

The mud guard 18 is mounted on the split frame 40 and 42 and against the upper end of the saddle post 38 to form a continuation thereof and the mud guard 20 is mounted on the split frame 44 and 46 and against the upper end of the saddle post 32 to form a continuation thereof.

The axle 72 for the rear wheel 12 is mounted on the split frame 40 and 42 and the axle (not shown) for the rear wheel 14 is similarly mounted on the split frame 44 and 46.

The vehicle is provided with outside running boards 74 and 76, which are similar to and serve the same function as the outside running boards illustrated in my said co-pending application Ser. No. 663,579 (matured into Pat. 2,514,900).

In the construction of the vehicle here concerned with the foot board 74 on the inside thereof is bent upwardly to form the longitudinal flange 78 and at the outside bent downwardly to form the longitudinal flange 79. Similarly the foot board 76 is bent on the inside to form the longitudinal flange 80 and on the outside to form the longitudinal flange 81.

The flanges 78 and 80 of the running boards are secured to the outside legs or flanges of the saddle posts 32 and 38 and to the split frame members 40 and 46.

In the drawing, I have illustrated my vehicle as constructed with one inner foot board 83, which extends from one side of the vehicle to the other side thereof, which construction strengthens and makes more rigid the vehicle frame and concurrently reduces somewhat the number of parts used for the frame, though it will be understood of course that, if desired, two inner running boards may be provided as is done in my said co-pending application, Ser. No. 663,579 (matured into Pat. No. 2,514,900).

In order to support the running boards on the frame of the vehicle and to integrate them with one another, I provide the spaced cross angle irons 82, 84, 85, 86 and 88, which extend from one side of the vehicle frame to the other side thereof and on the horizontal flanges of which the running boards are secured, the angle iron 84 extending on the inside of the vehicle from one inside flange of the saddle post 38 to the inside flange of the other saddle post 32.

The vertical flange of the angle iron 84 is mounted on the elements of the saddle posts 32 and 38 between the side legs thereof and the vertical flange 90 of the angle iron 88 (see Fig. 3) is secured to the depending arms 92 and 94 of a transverse hollow beam 96, the rear wall of which is a dash board 96' supporting member 98, to which reference will be further made hereafter.

It will now be noted that strengthening flanges are thus provided in the lateral or crosswise direction by the cross connections 82, 84, 85, 86 and 88 and strengthening flanges in the longitudinal directions by the foot boards 74 and 76 and the inner board 83, respective parts of which are connected to the saddle posts 32 and 38 and the split frames 40 and 42 and 44 and 46.

Thus there is provided a relatively rigid floor which permits easy dismounting as well as the carrying of equipment and articles between the driver and rider or passenger.

In vehicles of the kind here concerned with, particularly in motorcycle tricycles, a dash board in front of the driver and rider or passenger was never heretofore proposed in which dash board could be carried various instruments and equipment, one of which is a radio which is so necessary in the military and police services, and which provision of a dash board is for the first time made possible by the construction herein proposed.

Thus, I provide a frame having two longitudinal box-like beams 26 and 34, to the front ends of which there now can be secured the hollow box-like transverse beam 96. The elements 92 and 94 of the U-shaped support 98 are secured to the vertical flange 90 of the angle 88 and are attached to the dash board.

On the front wall of the hollow beam 96, I mount the head lights 100 and the radio antenna 102. It will be recognized that in the construction contemplated by me, the dash board 96 also serves as a means of protecting the driver and rider or passenger.

Although I have illustrated a hollow beam wide enough to extend only from one longitudinal beam to the other longitudinal beam, it will of course be understood that the width of the dash board may be increased so that both longitudinal beams may be lengthened and carried through the hollow beam, which would be widened to extend laterally on each side of the longitudinal beams and thus provide greater space for storage and greater protection for driver and rider or passenger since the dash board then extends in front of them.

Referring now particularly to Figs. 5 to 7, inc., the steering column 104 for the front wheel is mounted in the hollow beam 96 and is carried at the proper angle by the inclined spaced supports 106 and 108 in the interior of the dash board.

The front wheel 10 is mounted between the side arms 110 in which the front axle 112 is journaled. The side stems or tines 114 and 116 of the steering fork or yoke 118 are secured at their lower ends to an intermediate part of the side arms 110 by the pin 115.

The front fender 16 is mounted on the front axle 112 by means of the arms 120 and 122. In order to provide the required operated resiliency to the front wheel and the steering mechanism, the ends of the side arms 110 inward of the front axle 112 are secured to one end of the suspending springs 124 and 126, the other end of which springs are secured in corresponding openings 127 (Fig. 5) on each side of the bracket 140. The compartment 129, on the underside of the hollow beam 96, as I shall describe, houses the connecting rod 24 and the steering unions. Thus, the springs 124 and 126 are free to turn when the vehicle is steered.

It will be understood of course that the manner of mounting the springs 124 and 126 is conventional as is the mounting of the side arms 110 and the arms 120 and 122 on the axle 112, as by the nuts 128 and washers 130.

The sleeve 132, in which the steering column 104 is journaled is affixed adjacent its upper end to the spaced supports 106 and 108 by the members 134 and 136 and adjacent its lower end extends through an opening in the lower floor 138 of the hollow beam 96 and in which lower floor the sleeve is mounted.

The steering mechanism, which I shall now describe, is arranged and constructed so that it may be interchangeably mounted for either right or left hand drive of the vehicle and throughout the views is illustrated for left hand drive.

At the rear of the steering fork or yoke 118, I mount the steering bracket 140 in which, on each side of the plane passing through the axis 142 of the steering post 104 and spaced equally therefrom, provide the sockets 144 in which the tapered shank 145 of the steering knuckle 184 (see Fig. 18) is seated when the connecting rod 24 is arranged for either the left hand or right hand. As pointed out, for convenience in illustration, the members of the steering mechanism are illustrated as positioned for left hand drive and in Figs. 5 and 6, the ball 146 on the end of the shank 145 is shown as upstanding from the steering bracket 140, it being understood that the ball 146 is seated in a pocket in the connecting rod 24.

It is of course understood that in Figs. 5 and 6 the socket 144 is shown empty to receive the tapered shank 145 when the vehicle is converted to right hand drive and the other socket is illustrated with the ball 146 extending outward for left hand drive in order to make for ease in description and illustration.

Referring now to Fig. 8 in that portion of the hollow beam 96 in front of the seat 28, I mount the sleeve 148 in which the steering post 150 is rotatably mounted. The handle bar 22 is removably mounted on the steering post 150 in any suitable manner, the bushing 152 serving to reduce friction of steering.

Seated in the interior of the hollow post 150 and affixed thereto I provide the shaft or tube 154, which shaft or tube is held in the split opening 156 at one end of the union 158 by the bolt 160 and lock nut 162. At the other end of the union 158 in the split opening 164, the shank 147 of the steering knuckle 149 is removably carried thereby by means of the bolt 168 and lock nut 170. The ball 166 is seated in the connecting rod 24 (see Fig. 18).

Referring now to Figs. 18 and 19, I have there illustrated the connecting rod 24 by means of which the steering movement of the handle bar 22 is translated to the steering fork or yoke 118. The connecting rod is bent into a substantial Z shape, the upper and lower tails 172 and 174 extending outwardly from the body of the Z in opposite directions and parallel to one another, thus giving to the Z a somewhat elongated shape in that the tails or cranks 172 and 174, instead of being horizontal as in a Z are bent respectively upward and downward.

This bend (as at 176) in the connecting rod 24 keeps the body of the connecting rod 24 free of the head stock or steering column illustrated in Figs. 5 and 6.

In order to make the connecting rod 24 symmetrical and balanced and constructed so that it may be interchangeably used for right or left hand steering, another and opposite bend (as at 182) is made at the other end of the connecting rod.

The ball 166, formed at the other end of the shank 147 of the steering knuckle 149, is mounted in a socket formed in the tail or crank 174.

As previously pointed out, when the steering mechanism is arranged for left hand drive of the vehicle, the steering knuckle 149 is mounted in the split opening 164 of the union 158 mounted on the end of the shaft 154, and the shank 145 of the steering knuckle 184 is seated in the socket 144 of the bracket 140 extending from the fork or yoke 118.

In order to provide for the balance required, each ball 146 and 166 lie in a common center line 183.

In order to take up any driving shocks, a coiled spring 185 may be mounted around the tube 150, in which tube the insert 154 is seated for reinforcement. This insert 154 provides the required thickness for the key which transmits the torque from the arm 158. It also permits a groove to be formed for the bolt 160, which with the arm 162 binds arm 158 to the post. Since the bolt is in a groove axial movement is prevented.

Thus steering by the handle bars 22 through the connecting rod 24 and the fork or yoke 118 correspondingly moves the front wheel 10.

A sleeve 190, which is similar in all respects to the sleeve 148 and has arranged therein a post 192 is mounted on the dash board in the same manner as is the sleeve 148. The arm 204, which is integral with the handle grip 36, is removably seated in the hollow post 192. For convenience in illustration, the manner of mounting is illustrated in Figs. 9 and 10 and applies to the construction illustrated in Fig. 8.

Referring now to Figs. 9 and 10, when my vehicle is arranged for left hand drive, the handle grip 36 for the passenger, who is seated on the right hand side of the vehicle, is mounted as first described, by seating the arm 204 in the post 192.

In order to give rigidity to the handle grip 36 and prevent it from being turned, I secure on the underside of the bottom wall 138 of the dash board 96 a bracket 188. The sleeve supporting bracket 194, as by means of the nut and bolt 196 and 198, is secured to the bracket 188. The sleeve 190 is mounted on the bracket 194 in any suitable manner as by the bolt 200 and nut 202. Thus, this arrangement prevents the handle grip 36 from being rotated by the rider or passenger.

When it is desired to steer my vehicle from the right side, the handle grip 36, integral arm 204 and hollow post 192 are removed and replaced by the handle bar 22, the post 150 and the accompanying steering mechanism including the union 158. For this conversion, the post 150 is inserted in the sleeve 190, from which sleeve the bolt 200 and the bracket 194 have been removed.

The bracket 194 is then transferred to the other bracket 188 and the transferred handle grip 36 and the sleeve 148 and inserted post 192 prevented from rotation in the manner previously described with reference to the sleeve 190 and post 192.

After the shaft 150 and its accompanying members including the tube 154 and the union 158 have been mounted in the hollow post 190, the connecting rod 24 is then arranged for right hand steering by inserting in the socket 144 in the bracket 140 on the left hand side of the center line 142, as viewed in Fig. 6, the tapered shank 145 of the steering knuckle 184 (see Figs. 18 and 19).

At the same time, the shank 147 of the steering knuckle 149 is seated in the end 164 of the transferred union member 158.

Thus, the vehicle has been converted to a right hand drive and steering is now effected from that side by the same connecting rod 24, which because of its shape and construction may be used to steer the vehicle from either side.

By reference to Figs. 18 and 19, it will be noted that the body of the connecting rod 24 and the tails or cranks 172 and 174 lie in a common plane, in which plane the movement of the connecting rod 24 translated from the handle bar 22 to the union member 140 takes place.

Referring now to Figs. 12 and 13, in view of the stability and riding comfort of my vehicle, the driver thereof may ride and steer it with one or both hands. Therefore, I insert the members 206 and in the split ends 207 of the handle bar 22 so that they extend upwardly substantially at right angles thereto and mount on the members 206, the preferably rubber hand grips 208 and 210. In each member 206, I mount a sounding horn button 212 which button is connected to the conventional wiring 214 and 216 so that the vehicle may be driven in safety with either hand.

As pointed out, the longitudinal beams 26 and 34 are rectangular in cross section and (see Fig. 14) comprise the side walls 218 and 220 and the dished in or concave upper wall 222 and concave lower wall 224.

Figure 2:
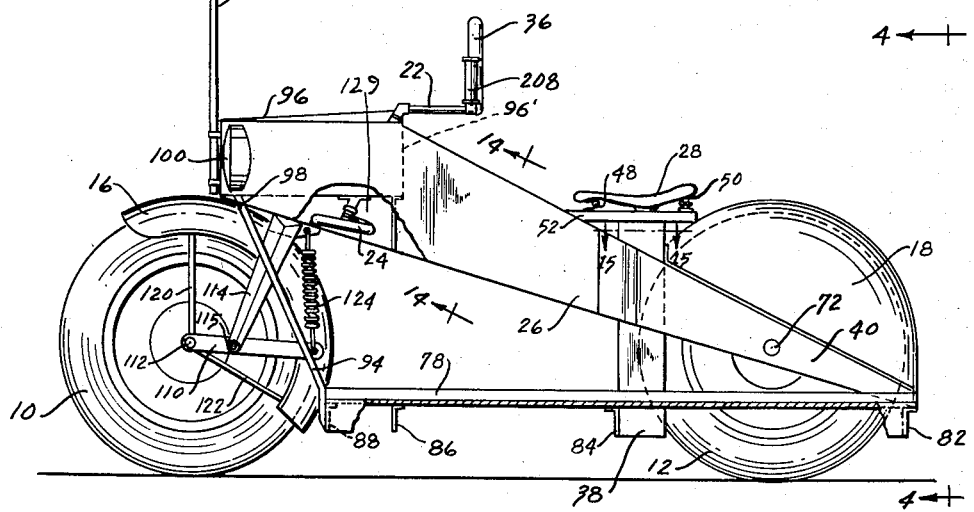
Fig. 2 is a side view thereof.

As illustrated in Fig. 2, the longitudinal beams extend downwardly from the hollow beam 96 to the rear of the vehicle and the dash board 96 is likewise slanted downwardly from the rear thereof to the front of the vehicle and from the center thereof to the sides of the vehicle. This construction serves to protect the rider and driver or passenger from rain collecting on the vehicle.

Water will run off the hollow beam 96 and since the upper cross section of the longitudinal beams is concave, no water will run down the sides of the beams onto the legs of the riders but instead is diverted to the rear where it will be discharged from the vehicle.

It will be apparent that the running boards, center foot board and the hand grips permit the driver and rider or passenger to stand up with safety while the vehicle is moving. Nevertheless, in order to give to the rider greater visibility in all directions, my vehicle may be modified by installing an observation tower 226 on the inner foot board 83 at the rear of the vehicle between the rear mud guards 18 and 20 and in alignment with the rear wheels 12 and 14.

The cylindrical base of the tower is raised above the inner foot board 83 on which it is mounted in any suitable manner, and the tower is preferably open at the top thereof, which top is provided with a railing 232 formed by the spaced uprights 228 secured together by the ring 230. The tower is so constructed so that the ring 230 is preferably located at substantially the waist of an observer standing on the platform formed at the top of the cylinder 226. Thus, an observer may see all about him as he stands in the observation tower. If desired, the observation tower may be so constructed and arranged so that the observer may be protected, as where the vehicle is used for military purposes or police strike duties.

To mount in position on the observation tower, the occupant thereof may step into position on the platform 83 and the step 233 onto the platform at the top of the base 226.

The tower 226 may be replaced by any equipment, such as that used in farms or fire fighting apparatus and in any case such equipment and any load may be arranged on the center line of the vehicle between the rear wheels thereof.

While I have shown and described certain specific examples of my invention, it will be understood that such examples are illustrative and are not given as limitations, since other modifications within the spirit and scope of the invention will be apparent to those skilled in the art. Hence, I do not intend to limit myself but intend to claim my invention as broadly as may be permitted by the state of the prior art and the terms of the appended claims.

I claim:

1. In a vehicle having a seat for the driver thereof and a second seat for a passenger carried thereby and in which the driver and passenger are seated astride the vehicle on each side thereof, a longitudinal beam on each side of the vehicle, a hollow post on each side of the vehicle and open at the rear thereof, the rear end of each longitudinal beam connected to the closed portion of the post adjacent thereto, a split frame connected to the rear end of each longitudinal beam and encompassing a hollow post, a rear wheel supported in a split frame at the rear of a hollow post for rotation therein, a transverse box-like hollow beam secured to the front of the longitudinal beams, wheel means at the front of the vehicle and carried by the transverse hollow beam, steering means mounted in the hollow beam, the driver's seat carried by one of the hollow posts and the passenger seat carried by the other of the hollow posts.

2. In a vehicle of the character described, a longitudinal beam at each side of the vehicle connected together and extending from the rear to the front thereof, means for seating the driver astride one beam, means for seating a passenger astride the other beam, lateral cross connections spaced from the front of the vehicle to the rear thereof, a foot board on the outside of each beam at each side of the vehicle and an integral inner foot board on certain of the cross connections between the longitudinal beams and extending from one beam to the other beam on the inside of the vehicle.

3. The vehicle of claim 2 and including an observation tower on the inner foot board centrally positioned at the rear of the vehicle.

4. A vehicle of the class described comprising a pair of spaced, parallel, longitudinal beams, means for connecting the front ends of the longitudinal beams together, each beam being split at the rear thereof, a hollow post at the front end of each split, said hollow posts being open at the rear thereof, and a wheel mounted for rotation within the split of each beam and in back of the hollow post in said split, said interconnecting means comprising a hollow box having a top wall, a bottom wall, a front wall and a rear wall, said rear wall constituting a dash board, and a platform supported by the beams.

5. The combination of claim 4, in combination with seats mounted on the hollow posts, a front wheel supporting frame mounted on the hollow box, and a front wheel mounted for rotation on the front wheel supporting means.

6. A vehicle of the character described comprising a pair of spaced, parallel, longitudinal beams, said beams having bifurcated elements at the rear ends thereof, a hollow post at the front of each bifurcated element, each hollow post being closed at the front and open at the rear, said beams being inclined downwardly and rearwardly, said posts extending below said beams, means to interconnect the lower ends of said posts, a platform mounted on said interconnecting means, means to attach the rear ends of the bifurcated element to the rear end of the platform, a hollow box interconnecting the front ends of said beams, means to interconnect the front end of the platform to said hollow box, wheels within said bifurcated elements and rotatably mounted thereon and in back of said hollow posts.

7. The combination of claim 6, in combination with a steering post rotatably mounted on a hollow box, a front wheel, means on the lower end of the steering post to support said front wheel for rotation.

8. The combination of claim 6, in combination with a steering post rotatably mounted on a hollow box, a front wheel, means on the lower end of the steering post to support said front wheel for rotation, seats mounted on said hollow posts, handle bars mounted for rotation on the front end of one beam, and means to connect the handle bars to the steering post.

9. A vehicle comprising a pair of longitudinal, parallel, spaced, side beams inclined downwardly and rearwardly, a hollow transverse box-like member interconnecting the front ends of said beams, said beams being split at their rear ends, hollow posts fixed to the beams at the front ends of said splits and projecting downwardly, a rear wheel received within the split of each beam, means for mounting said wheels for rotation on said beams on a common axis, said posts being located in front of said wheels and being of transverse channel-shaped cross section opening to the rear, a transverse member interconnecting the lower ends of said posts, a horizontal platform mounted on said interconnecting member, means to fix the rear ends of the split portions of said beams to the rear end of the platform, means interconnecting the front end of the platform with said transverse box, a steering post rotatably mounted on the center of the box and between said beams, a front wheel rotatably mounted on the steering post, handle bars rotatably mounted on the front end of one of said beams, means to connect the handle bars with said steering post.

10. The combination of claim 9, in combination with a handle grip mounted on the front end of the other beam.

HENRY S. RITZEL.

References Cited in the file of this patent

UNITED STATES PATENTS

| Number | Name | Date |
|---|---|---|
| 437,026 | Flachs | Sept. 23, 1890 |
| 599,564 | Kintner | Feb. 22, 1898 |
| 1,170,148 | Grogan | Feb. 1, 1916 |
| 1,371,842 | Biagi et al. | Mar. 15, 1921 |
| 1,889,580 | Willett et al. | Nov. 29, 1932 |
| 2,094,217 | Meredith | Sept. 28, 1937 |
| 2,100,561 | Kliesrath | Nov. 30, 1937 |
| 2,425,516 | De Witt | Aug. 12, 1947 |

FOREIGN PATENTS

| Number | Country | Date |
|---|---|---|
| 72,123 | Norway | May 19, 1947 |
| 224,251 | Great Britain | Mar. 19, 1925 |
| 256,164 | Italy | Dec. 12, 1927 |
| 590,649 | Great Britain | July 24, 1947 |